Oct. 8, 1929.  R. CRAIG  1,730,451
SCALE
Filed Oct. 12, 1923  2 Sheets-Sheet 1
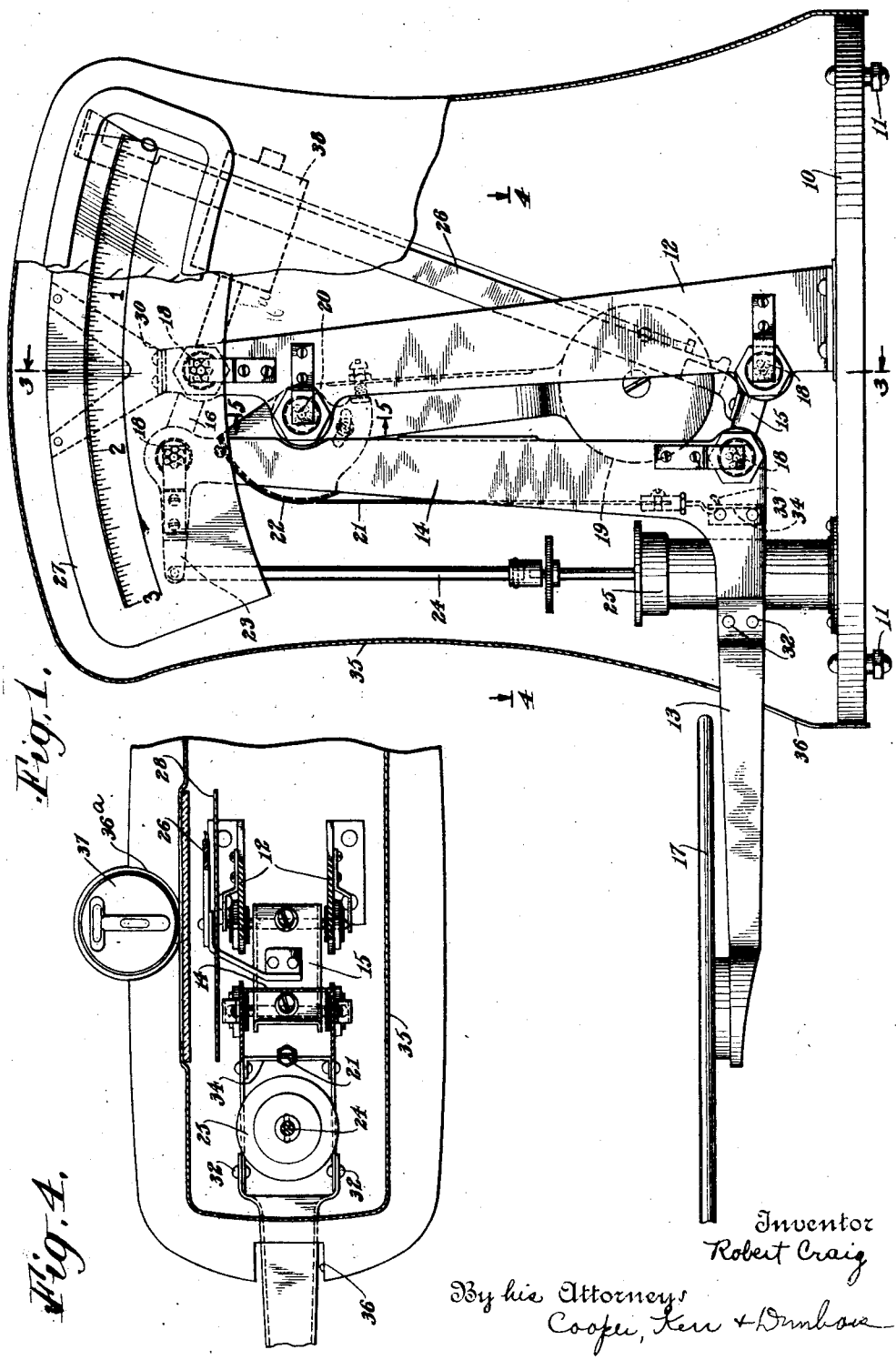
Inventor
Robert Craig
By his Attorneys
Cooper, Kerr + Dunbar Oct. 8, 1929.  R. CRAIG  1,730,451
SCALE
Filed Oct. 12, 1923   2 Sheets-Sheet 2
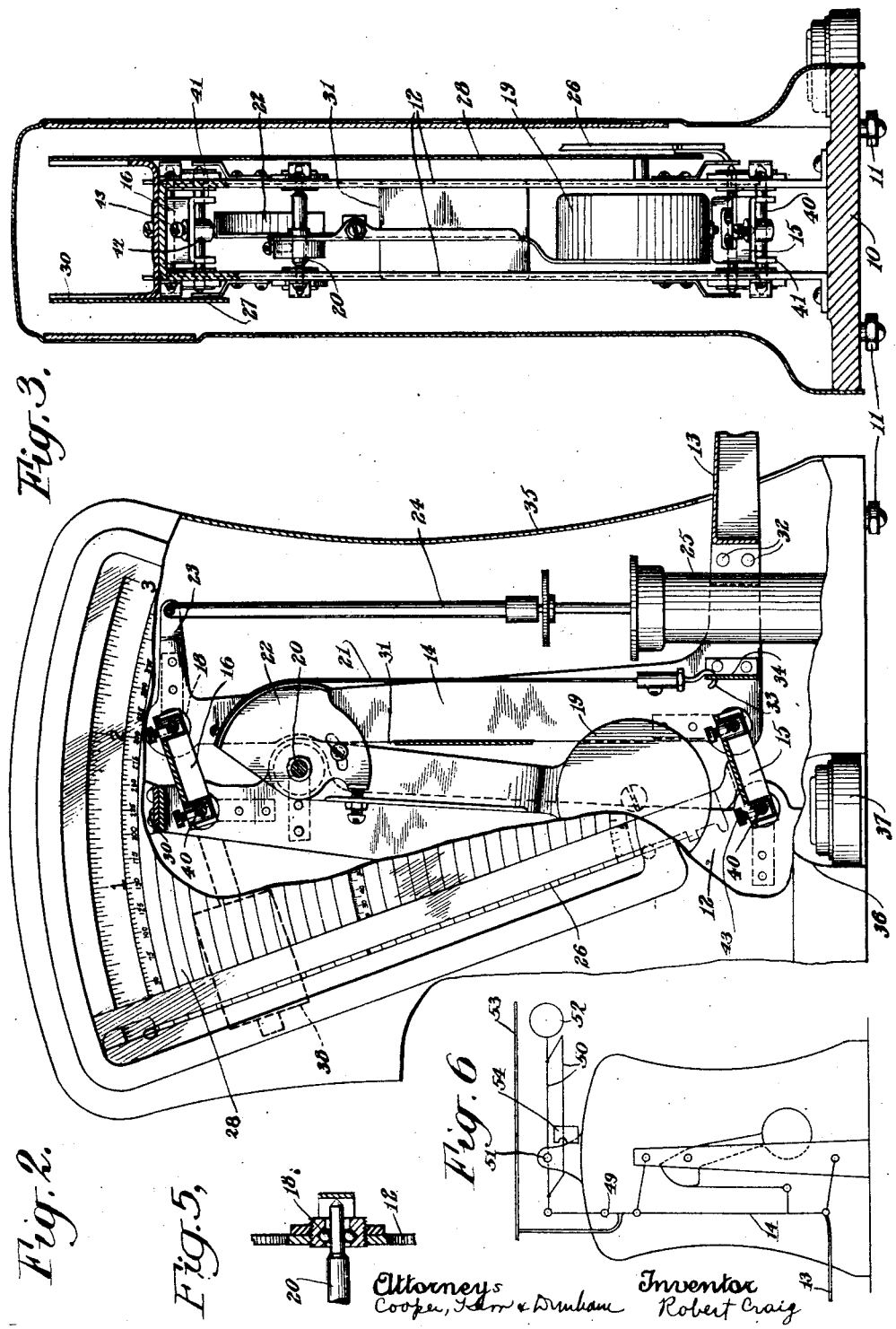

Patented Oct. 8, 1929

1,730,451

UNITED STATES PATENT OFFICE

ROBERT CRAIG, OF DAYTON, OHIO, ASSIGNOR TO DAYTON SCALE COMPANY, OF DAYTON, OHIO, A CORPORATION OF NEW JERSEY

SCALE

Application filed October 12, 1923. Serial No. 668,076.

This invention relates to improvements in weighing scales and has for its object the provision of a scale which will be cheap, simple to manufacture and assemble and which may be readily adapted for the various demands for small size weighing appliances.

In the drawings,

Fig. 1 shows a rear view of the scale with portions of the housing broken away to show the interior construction.

Fig. 2 is a front view of the scale with part of the housing and platform parts broken away.

Fig. 3 is a detail sectional view taken on line 3—3 of Fig. 1.

Fig. 4 is a sectional view taken on line 4—4 of Fig. 1.

Fig. 5 is a detail view of one of the ball bearings, and,

Fig. 6 is a diagrammatic view of a modified form of my invention.

In the manufacture of weighing scales it is desirable that the sealing of the scale be expedited and facilitated since such sealing frequently involves considerable time. In the present invention provision is made for mounting all of the operating parts of the scale on a fixed base. The scale may then be sealed, adjusted and tested in any desired way. Subsequently after the scale is sealed the enclosing housing is put in place, the same being arranged to slip over the operative parts without interfering with the same. In order that the scale may be assembled in this manner all operative parts of the scale mechanism are supported from the base of the scale.

Referring now to Fig. 1, 10 is the base of the scale provided with levelling feet 11. Extending upwardly from the base and fastened thereto are sheet metal brackets 12 upon which most of the operative parts of the scale are supported. The load support includes a bent crank shaped member 13 which at one end suitably supports the platform or pan 17 which may be of any desired type. To the other arm 14 of the member 12 suitable check links 15 and 16 are provided. These check links preferably have a ball bearing connection 18 with the arm 14 at the upper and lower end thereof and also have a similar connection with the main bracket 12. The frame 12 is bifurcated as shown in Fig. 3 of the drawings and this bifurcation permits a load offsetting pendulum 19 to swing between the bracket arms. The pendulum 19 is suitably supported in ball bearings 20 carried by the bifurcated frame. To operatively connect the pendulum with the load actuated parts a tape 21 is provided which is rolled over and fastened to a suitable compensating cam 22 adjustably secured to the pendulum assembly. The lower end of the tape 21 is suitably connected with the member 13. Arm 14 is provided with a projecting portion 23 to which a suitable link 24 connects the plunger of dash pot 25. To indicate the load which is offset an indicator 26 is provided. This indicator is of the type commonly used in fan scales and is arranged for front and back indication. The indicator proper is mounted on the check link 15 so as to be rocked by the latter during the displacement of the same by the applied load. Dual charts 27 and 28 are provided, the former being for indicating weight at the rear of the scale and the latter being a combined weight and price chart of the usual fan type. Charts 27 and 28 are preferably supported by a U-shaped bracket member 30 which is fast to the top of the forked bracket 12, as is best shown in Fig. 3.

Lower check 15 is of plate construction as is indicated in Fig. 2 of the drawings and the upper check is also in the form of a plate with rods extending into the ball bearings. The load supporting parts 13 and 14 are preferably formed of pressed sheet metal. The upstanding arm portions 14 are bifurcated as shown at 31 (Fig. 3) to permit the pendulum cam to pass therebetween. The lower ends of the arm 14 are also bifurcated to a sufficient extent to permit the passage of the pendulum ball between the arms. Preferably the parts 13 are secured to the parts 14 by suitable rivet fastenings 32. The connection intermediate the tape 21 and the members 13 includes the hook 33, which hook engages a suitable opening in a cross member 34 (Fig.

4). The housing 35 is of any desired contour to properly slip over the operative parts of the scale and is provided with a slotted opening at 36 to permit the housing to slip over the load supporting parts 13. The housing is also preferably notched out as shown at 36ᵃ in Fig. 4 to permit a spirit level 37 to be directly attached to the base 10. The housing also is provided with suitable glass covered openings to disclose the weight and price charts.

The scale herein disclosed is particularly adapted to be formed from sheet metal. The entire operating assembly is built up and supported by the base 10 permitting assembly of the parts before the housing is placed in position. None of the parts are supported by the housing which not only facilitates manufacture and assembly of the scale but also minimizes the chances of the scale being thrown out of adjustment when in use.

The checks 15 and 16 are preferably adjustable on their arbors 40 which fit into the ball bearings 18. To secure such adjustment each plate 15 and 16 is provided with depending ears 41 which are drilled to receive the arbor 40. A cylindrical member 42 is also provided with lateral drilled openings to receive the arbor and with a tapped opening to receive a set screw 43. The cylindrical boss fits into an opening in the plates 15 and 16. By loosening the set screw 43 the entire check link may be shifted laterally with respect to the arbor until the desired setting is obtained. The set screw is then tightened and the arbor 40 then rocks in unison with the check plate 15.

Fig. 5 shows the preferred form of ball bearing which is employed. The race portion 45 is threaded to fit a threaded opening in the supporting plate and may be locked by a suitable nut 46. The ends of the various arbors are preferably pointed as shown and are prevented from shifting endwise by a steel member 47 which is suitably secured to the supporting plate.

If the weight of the platform 17 be considerable, it may be desirable to provide a separate counterbalance therefor. When such counterbalance is desired, the upper check link 16 is extended as shown at 16ᵃ and a counterweight 38 is applied thereto. Such counterbalancing weight can be entirely omitted from small scales.

In Fig. 6 there is shown a modification in which the arms 14 are extended upwardly beyond the bearing 18. To such extension 49 there may be attached a tare beam 50 of the usual form with sliding poise 54 and having its fulcrum 51 upon the top of the casing 35. This tare beam may be weighted as indicated at 52 to counterbalance the weight of the platform parts.

To such extension 49 there may also be attached an upper platform 53. The scale may be made with both upper and lower platforms or with either one and not the other. Similarly I contemplate the use of the tare beam construction with any of the platform constructions. When a tare beam is utilized with a counterweight 52 there is no necessity for using such counterbalance as 38 for the platform.

The scale herein described being provided with a low platform and scoop is particularly adaptable for weighing candy and other like articles where the scale is usually placed upon the top of a show-case. Furthermore the construction is such that the weight of the complete scale is comparatively small thereby making the same suitable for the tops of glass show-cases which ordinarily cannot support a heavy piece of apparatus. Further, the chart housing is such that a comparatively long chart may be used thus permitting an extensive range of prices to be employed.

What I claim is:—

1. In a weighing scale, in combination with a base, of a standard carried thereby, a pair of check links supported by said standard and disposed above said base, a load support carried by said check links, at one end thereof and also disposed above said base, a load counterbalancing pendulum carried by said standard and mounted independently of said check links, a cam carried by said pendulum, a tape cooperating therewith connected to said load support, means for indicating the amount of the counterbalanced load, and a housing supported directly from the base enclosing the standard and the foregoing working parts of the scale and being independent of connection therewith for the purpose described.

2. A weighing scale comprising a supporting standard, a pair of check links, ball bearings carried by said standard for pivotally supporting said check links at one end thereof and maintaining the same against lateral displacement therewith, a single load support pivotally connected to the opposite ends of both of said check links, a load counterbalancing pendulum pivotally supported in said frame, and driving connections including a compensating cam and tape intermediate said pendulum and load support, said tape extending in proximity to and connecting with said load support.

3. A weighing scale comprising in combination with a base, a supporting inverted U-shaped frame of sheet metal attached thereto, a U-shaped member attached to the top of said frame, a pair of charts carried by said U-shaped member, a pair of check links pivotally supported by said frame, load counterbalancing means carried by said frame, an L-shaped load supporting member carried by said check links, and an indicator connected to one of said check links and adapted to traverse the aforesaid charts.

4. In a weighing scale, in combination with a supporting frame structure, a plurality of pairs of ball bearings therein, a pair of check links supported at one end by said ball bearings, a load supporting frame, a plurality of pairs of ball bearings carried by the said load supporting frame and receiving the free ends of the aforesaid check links, pendulum load counterbalancing means supported by said first mentioned frame, means connecting the load supporting frame therewith, and means for indicating the automatically counterbalanced load.

5. A weighing scale comprising a base, a supporting frame secured thereto, a load counterbalancing pendulum supported by said frame, a pair of supporting ball bearings carried by said frame, arbors supported in said ball bearings, channel plate structures having their edges apertured to receive said arbors, studs slidably mounted upon said arbors intermediate their ends, and fitting apertures in said plate structures, set screws threaded into said studs and adapted to clamp the same to the said arbors, a load support pivotally connected to the other end of said channel plate structures, and means directly connecting said load support with the aforesaid pendulum counterbalancing means.

6. A weighing scale comprising a base, a supporting frame secured thereto above said base, a pair of check links and a load counterbalancing pendulum each individually supported independently of the other by said frame and above said base, a load support pivotally connected to said check links at the free ends thereof, means directly connecting said load support with said pendulum counterbalancing means, and a housing fitted to the base and encasing the frame and the aforesaid working parts of the scale, said housing being independent of connection to said frame and working parts whereby the same may be removed with the working parts maintained in assembled relation.

7. A weighing scale comprising a supporting standard, a pair of check links pivotally connected therewith, a load supporting frame pivotally connected to said check links and having the load supporting portion thereof disposed adjacent the lower check link, pendulum counterbalancing means connected to said load supporting frame and a weight indicator connected to and displaceable in unison with one of the aforesaid check links for indicating the amount of the applied load.

8. In a weighing scale, in combination with a supporting standard, a pair of check links pivotally supported thereon, an element connected to the opposite ends of said check links and having a load supporting platform connected therewith, automatic pendulum load counterbalancing means carried by said standard and connected to said element, and a tare beam also connected to said element.

9. A weighing scale comprising a framework, operative weighing mechanism, parts mounted thereon, a casing for housing said frame-work and all of the operative parts of said mechanism, a goods support without said housing and supported by said operative parts, the aforesaid casing comprising a unitary assembly and said casing while remaining a unitary assembly being removable with the operative parts maintained in assembled and working relation.

10. A weighing scale having a frame and operative parts comprising a load counterbalancing and load supporting system mounted thereon, an independent casing removable as a whole from encasing position over said frame and associated parts to provide access to all the operative working parts of the scale while maintaining the operative relations of said parts, said casing when in encasing position upon the frame over the operative parts providing for the protecting and housing of the parts during the operative weighing movement of said parts.

11. A weighing scale comprising a base, weighing mechanism mounted thereon and disposed entirely over said base, a cover for said mechanism mounted upon said base, said cover being entirely independent of said weighing mechanism and being removable as a unit to provide access to said mechanism while said mechanism is in operative condition, said cover when mounted upon said base affording a cover for the weighing mechansim at times when the weighing mechanism is being operated for weighing.

12. The invention set forth in claim 11 in which the weighing mechanism includes an indicator and a chart structure, which parts are adapted to remain in operative and assembled relation upon removal of the cover.

13. A weighing scale comprising a framework, a complete weighing mechanism operatively mounted thereon, a casing for housing said framework and substantially all parts of said weighing mechanism requiring adjustment, said casing being entirely independent of said frame-work and mechanism and being removable from the encasing position to provide access to said mechanism while the same is in operative condition, said casing when in encasing position upon the frame work serving as a cover for the weighing mechanism when said weighing mechanism is being used for weighing and said casing being removable as an assembled unit from said frame work.

In testimony whereof I hereto affix my signature.

ROBERT CRAIG.